2,352,992

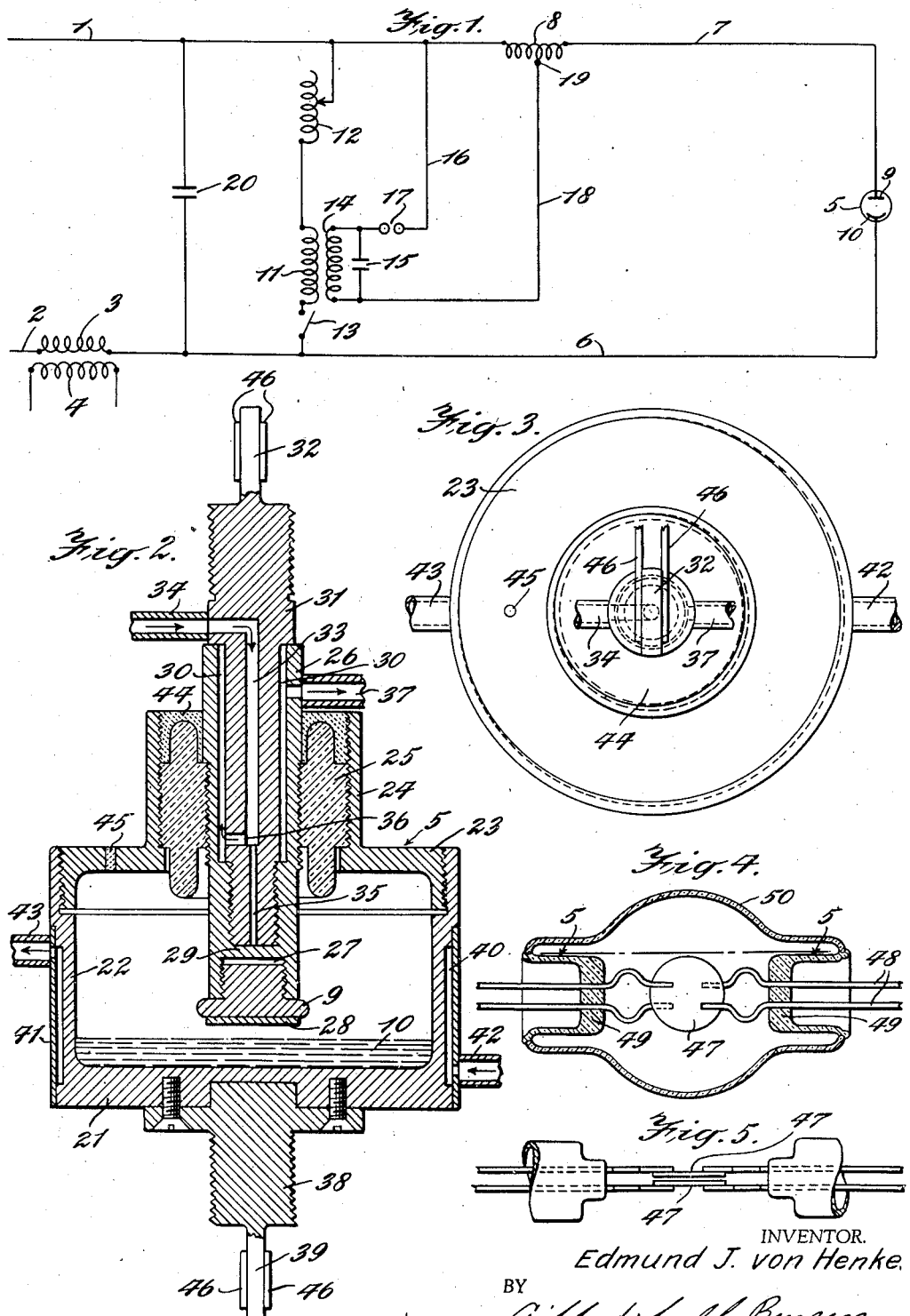
July 4, 1944. E. J. VON HENKE 2,352,992
ELECTRIC SWITCH
Original Filed Dec. 28, 1938
INVENTOR.
Edmund J. von Henke.
BY
Gifford, Scull & Burgess
ATTORNEYS Patented July 4, 1944

UNITED STATES PATENT OFFICE 2,352,992

ELECTRIC SWITCH

Edmund J. von Henke, Chicago, Ill., assignor to American Electric Fusion Corporation, Chicago, Ill., a corporation of Illinois Original application December 28, 1938, Serial No. 248,023, now Patent No. 2,289,813, dated July 14, 1942. Divided and this application May 18, 1940, Serial No. 335,933

3 Claims. (Cl. 250—27.5)

This application is a division of my copending application Ser. No. 248,023, filed December 28, 1938, issued as Patent No. 2,289,813, July 14, 1942.

The invention relates to a novel and improved form of switch for use in an alternating current circuit and which will avoid the necessity of a movable contact. The invention will be better understood from the following description and the annexed drawing, in which I have shown selected embodiments of the invention and in which:

Fig. 1 is a diagram of a circuit in which the switch may be used;

Fig. 2 is a vertical section through one form of switch;

Fig. 3 is a plan view of the structure appearing in Fig. 2;

Fig. 4 is a longitudinal section through a different form of switch;

Fig. 5 is a view of the structure appearing in Fig. 4 and taken approximately on the line 5—5 of Fig. 4.

For purposes of illustration, I have shown a circuit in which alternating current is supplied from any suitable source through the main leads 1 and 2 and this current may be used to energize the primary 3 of a welding transformer, the secondary of which is indicated at 4. This transformer may be used to apply current to welding electrodes in a manner well known in the art and is selected as an example of a load, which, however, may take any other form, so far as this invention is concerned.

The circuit through the primary 3 includes my novel switch 5 which is connected to one end of the primary 3 by the conductor 6 and which is connected to the lead 1 by means of a conductor 7 and an auto-transformer 8, of the air core type.

The switch 5 is in the form of a tube having spaced electrodes, here shown as an anode 9 and a cathode 10. These electrodes are disposed in an enclosure containing an inert gas at low pressure, as will be more fully explained later. For the present it is enough to say that the spacing of the electrodes and the character and pressure of the gas in the enclosure is such that the circuit through the switch will be maintained open for currents of normal or usual characteristics.

For example, the current used to energize the primary 3 may have the usual voltage of 110 or 220 and a normal or usual frequency, say 60 cycles per second. The circuit of the primary normally will be maintained open by the tube switch 5, but may be closed electrically, so as to carry alternating current in both directions. This closing may be accomplished by passing through the switch in both directions an alternating current of high voltage and high frequency. This may be done by the arrangement indicated in Fig. 1.

Across the conductors 1 and 6 is disposed the primary 11 of a transformer and a variable resistance 12. There is also provided a conventional switch 13, which, for the purpose of illustration, may be assumed to be hand operated. The transformer of which the primary 11 is a part comprises a secondary 14 across which is placed a condenser 15. From one side of the secondary 14 leads a conductor 16 to the conductor 1 and an air gap 17 is preferably placed in this conductor 16. The other side of the secondary 14 is connected by a conductor 18 which leads to one of the coils of the auto-transformer 8, at 19. Across the conductors 1 and 6 is also placed a condenser 20, as indicated.

In operation, assume that the circuit through the primary 3 is open at the tube switch 5 and that it is desired to close that switch to energize the primary. Also assume that the alternating current supplied to the primary 3 is 110 v., 60 cycles, which characteristics are usual in an alternating current. Now, in order to electrically close the tube switch 5, the hand switch 13 is closed, thus permitting passage of current through the primary 11.

By the use of the air gap, condenser, and auto-transformer, the current induced in the secondary 14 is stepped up to a voltage and frequency which is high enough to break down the resistance in the tube switch 5 and thus cause this high voltage, high frequency alternating current to pass in both directions between the electrodes 9 and 10. By the word "between" as here used I intend to refer to the passage of current from one electrode to the other. For example, the high voltage, high frequency current resulting from the above described arrangement and operation may be on the order of 2500 v., 500,000 cycles. As soon as this current establishes a path by which it may pass in both directions across the space between the electrodes 9 and 10, then the alternating line current, which I have referred to as the usual current, may also pass in both directions across this space, following the path created for it by the high voltage, high frequency current. Since the auto-transformer 8 is of the air core type, it will carry the line current.

Naturally, the voltage and frequency of the high voltage and high frequency current will vary, being dependent upon the characteristics of the tube switch and of the circuit in general. The one voltage and frequency to which I have referred is taken only as illustrative, since any voltage and frequency which is high enough to break down the resistance of the gas between the electrodes in the tube switch is sufficient. In other words, the tube switch 5 is so designed as not to break down and permit passage of what I have referred to as the usual current, that is to say, the line current used to perform the desired work. Given the characteristics of that current, then the tube switch, and the voltage and frequency of the current used to break down the resistance therein, may be readily determined by those skilled in the art.

The tube switch 5 will continue to transmit the line current so long as the hand switch 13 is maintained closed. Because of the high frequency used in what I may term the closing circuit, that is to say, the circuit used to break down the resistance in the tube switch 5, the primary 3 will act as a choke and prevent the high frequency current passing through it, forcing that current to pass through the condenser 20. In other words, the condenser 20 is what is sometimes referred to as a "blocking" condenser.

Preferably, the primary 11 is designed to take only a low voltage, say, 10 v., and the other elements of the circuit are so designed that when the voltage in the primary 11 reaches that figure, the high voltage and high frequency current will break down the resistance in the tube switch 5. This current will then pass through the circuit, including the condenser 20, thus bypassing the primary 11 so that it will not be subjected to a voltage greater than that for which it is designed. It will also be understood that the condenser 20 prevents the full voltage from being impressed upon the primary 11. This condenser 20 may be of variable or adjustable capacity, if desired, although for convenience it is indicated as a non-adjustable type having a capacity suitable for the particular circuit with which it is used.

The circuit described above is merely one form of a means for creating an alternating current of high voltage and high frequency and for passing that current in both directions through the tube switch. It is to be understood, of course, that other arrangements may be used to achieve the same result. For example, the primary 11 may be energized from an independent source of current, if desired. The specific circuit disclosed herein is claimed in the copending application of Arthur A. Grothe, Ser. No. 249,429, filed January 5, 1939, and is described herein only as one means for creating a current of high voltage and high frequency. I am aware that electronic rectifying tubes have been used in pairs, each tube in a pair being arranged to permit passage of current in one direction, but not in the other, when the gas in the tube is ionized. However, my invention provides one tube acting as a switch which may carry current in both directions. At the same time, by the use of suitable timing mechanism, the tube may be used to carry current in only one direction, as shown for example in said copending application of Arthur A. Grothe.

Referring now to Figs. 2 and 3, I have shown therein a preferred form of the tube switch 5 comprising a cup 21, preferably of steel, and having a closed bottom, as shown. From the bottom extends upwardly a circumferential wall 22 provided with screw threads adjacent its upper edge to engage corresponding threads on a top 23 having an upwardly extending neck 24. This neck is threaded on its inner surface, and threaded within it is a bushing 25. Preferably, the top and its neck are steel or other metal and the bushing 25 is of ceramic material or any other suitable insulating material.

Threaded within the bushing 25 is a metallic electrode holder 26 extending downwardly into the enclosure formed by the cup and top. The lower end of the holder 26 is provided with a recess 27 within which is threaded the electrode 9, which may be copper and which may have a tungsten head 28 disposed parallel to the surface of the pool 10.

The holder 26 is shown as being hollow throughout its length except for a wall 29 which divides the recess 27 from an upper recess 30, in the lower end of which is threaded a rod 31, the upper end 32 of which may contact with a suitable electrical conductor. The holder 26 may conveniently be made of steel, and the rod 31 may be made of copper. Thus it will be seen that a conducting path is provided through the rod 31 and through its threaded engagement with the holder 26 and the threaded engagement of the electrode 9 directly to the head 28 of that electrode. At the same time, the wall 29 provides a seal for the space within the enclosure.

For cooling purposes, the rod 31 may be provided with a duct 33 through which a cooling fluid may pass from a pipe 34. This duct is shown as having an extension 35 extending downwardly to the wall 29 and also as being connected by one or more ducts 36 to a space forming part of the upper recess 30, it being noted that the part of the rod 31 in this recess is spaced from the walls thereof. Fluid thus may flow from the pipe 34 through the ducts 33 and 36 into the space around the rod and then out through a pipe 37. Secured to, and in intimate contact with, the bottom of the cup is a copper electrode 38 having an end 39 for contact with a suitable electrical conductor.

It will thus be seen that current may be supplied to the mercury pool 10 forming the cathode, while at the same time the enclosure is maintained sealed. If desired, the cup may be cooled, for example by providing a recess 40 in its outer surface, which may be closed by a plate 41 welded or otherwise secured over it. Cooling fluid may enter the space thus formed through a pipe 42 and leave through a pipe 43.

In assembling the parts as described above, the cup and electrode 38 may be first assembled and then the top 23 may be threaded into place. Any suitable sealing compound may be used to seal the threads between the cap and top. Then preferably the threads of the bushing 25 will be glazed, by the application of heat, and then while hot the bushing is threaded into place and the holder 26 is also threaded into place in the bushing. Then when the bushing cools, a very tight seal is achieved and in fact the bushing can only be removed by heating again. The bushing may be covered by any suitable sealing compound 44.

Before the parts are assembled, of course it will be understood that mercury is placed in the bottom of the enclosure, and, after the parts are assembled, the space above the pool may be evacuated of air and filled with inert gas under the desired pressure. For this purpose one or more vent openings 45 may be provided, these openings being then closed, as by welding.

The material used in the bushing 25, as pointed out above, is preferably a ceramic material capable of being glazed, and I have found a suitable material to be that sold under the trade name of AlSiMag and which consists chiefly of

MgO—SiO$_2$

The surface areas of the two electrodes may readily be determined by those skilled in the art and these surfaces are placed so close together that the resistance of the space therebetween may be broken down by the particular high voltage, high frequency current for which the rest of the apparatus is designed. Preferably the spacing of the electrodes is close enough so that the high voltage, high frequency current will form a single path as it passes between the electrodes, although that path is usually not constant in position.

The space within the enclosure is filled with an inert gas, preferably argon, at a pressure which is substantially less than atmospheric and is substantially greater than a vacuum. For example, I have found that a pressure corresponding to from 15 inches to 20 inches of mercury (atmospheric pressure corresponding to 30 inches and vacuum to 0 inches) is satisfactory for many conditions, although it is to be understood that the pressure is another variable which must be achieved so as to prevent the resistance of the space between the electrodes breaking down except under the influence of the high voltage and high frequency current which is to be used for that purpose. In other words, the current, the spacing of the electrodes, and the pressure of the gas within the enclosure are variables which must be adjusted to each other.

While I have mentioned argon as the preferred inert gas to use within the enclosure, other inert gases may also be used, for example any one of a group including argon, neon, helium, and xenon. Similarly, while other material than mercury may be used for the cathode, I prefer to use mercury so that the mercury vapor arising from the pool will mix with the inert gas. That is to say, the space between the electrodes will be occupied by an inert gas mixed with mercury vapor.

The tube switch shown in Figs. 2 and 3 is one which is so designed that it may be rugged and of relatively inexpensive material, steel being used for a large part thereof. The connections shown at 32 and 39 may be in the form of flat surfaced extensions on the parts 31 and 38, respectively, and which may be forced between spring contacts 46. Thus the entire tube switch may be readily put in place and removed.

Referring now to Figs. 4 and 5 I have shown therein another form of tube which may be used under some circumstances, this tube comprising two tungsten plates 47 which form the two electrodes and which may be connected to conductors 48 which are sealed into opposite ends 49 of a glass tube 50. This tube forms an enclosure within which is an inert gas of the kind referred to above.

While I have shown the invention as embodied in specific forms, it is to be understood that various changes in details may be made without departing from the scope of the invention as defined by the appended claims.

I claim:

1. An electronic switch for controlling the passage of an alternating load current across said switch comprising a tube containing an inert gas at a substantial pressure, a pair of closely spaced electrodes in said tube, the pressure of the gas and the spacing of the electrodes being such as to form a high-resistance gap between said electrodes, the high-resistance gap being normally non-conductive at the voltage and frequency of the load current and being capable of being made conductive to carry said alternating load current in both directions only during the application across said electrodes of a current having substantially higher voltage and frequency than the load current.

2. An electronic switch for controlling the passage of an alternating load current across said switch comprising a tube containing an inert gas at a pressure of from 15 to 20 inches of mercury, a pair of closely spaced electrodes in said tube, the pressure of the gas and the spacing of the electrodes being such as to form a high-resistance gap between said electrodes, the high-resistance gap being normally non-conductive at the voltage and frequency of the load current and being capable of being made conductive to carry said alternating load current in both directions only during the application across said electrodes of a current having a voltage and frequency of the order of 2500 volts and 500,000 cycles per second.

3. An electronic switch for controlling the passage of an alternating load current across said switch comprising a tube containing an inert gas at a pressure of from 15 to 20 inches of mercury, a pair of closely spaced electrodes in said tube, the pressure of the gas and the spacing of the electrodes being such as to form a high-resistance gap between said electrodes, at least one of said electrodes having a face of greater width than the width of said gap, the high-resistance gap being normally non-conductive at the voltage and frequency of the load current and being capable of being made conductive to carry said alternating load current in both directions only during the application across said electrodes of a current having a voltage and frequency of the order of 2500 volts and 500,000 cycles per second.

EDMUND J. von HENKE.